(12) United States Patent
D'Souza et al.

(10) Patent No.: US 11,019,040 B2
(45) Date of Patent: *May 25, 2021

(54) CLOUD KEY ESCROW SYSTEM

(71) Applicant: Microsoft Technology Licensing, LLC, Redmond, WA (US)

(72) Inventors: Roy Peter D'Souza, Bellevue, WA (US); Omkant Pandey, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/457,036

(22) Filed: Jun. 28, 2019

(65) Prior Publication Data

US 2020/0028828 A1    Jan. 23, 2020

Related U.S. Application Data

(60) Continuation of application No. 15/608,704, filed on May 30, 2017, now Pat. No. 10,348,696, which is a
(Continued)

(51) Int. Cl.
*H04L 29/06* (2006.01)
*H04L 9/08* (2006.01)
(Continued)

(52) U.S. Cl.
CPC ........ *H04L 63/0428* (2013.01); *G06F 21/602* (2013.01); *H04L 9/085* (2013.01);
(Continued)

(58) Field of Classification Search
CPC . H04L 63/083; H04L 63/104; H04L 63/0428; H04L 63/0421; H04L 63/061;
(Continued)

(56) References Cited

U.S. PATENT DOCUMENTS 7,707,413 B2 *  4/2010  Lunt ............... H04L 63/102
                                                           713/168
10,425,402 B2 *  9/2019  D'Souza ........... G06F 21/6254
(Continued)

OTHER PUBLICATIONS

"Implementation and Performance of Threshold Cryptography for Multiple Escrow Agents in VOIP"—Abdullah Azfar, International Joint Conference on Advances in Signal Processing and Information Technology, May 2011 https://link.springer.com/chapter/10.1007/978 (Year: 2011).*

(Continued)

*Primary Examiner* — Randy A Scott

(74) *Attorney, Agent, or Firm* — Workman Nydegger

(57) ABSTRACT

Embodiments are directed to storing encrypted data in a data store and to securely providing access to the encrypted data according to a predefined policy. A data storage system receives encrypted data. The data is encrypted using a private key. The data storage system stores the received encrypted data according to a predefined policy. The encryption and the policy prevents the storage system from unencrypting the encrypted data, while the policy allows the encrypted data to be released upon receiving a threshold number of requests from verified third parties. The data storage system implements a verifiable secret sharing scheme to verify that the encrypted data can be reconstituted without the data storage system decrypting the encrypted data. The data storage system can acknowledge that the received encrypted data has been verified and successfully stored.

20 Claims, 4 Drawing Sheets

Related U.S. Application Data continuation of application No. 14/542,904, filed on Nov. 17, 2014, now Pat. No. 9,667,599, which is a division of application No. 13/162,950, filed on Jun. 17, 2011, now Pat. No. 8,891,772.

(51) Int. Cl.
  *G06F 21/60* (2013.01)
  *H04L 9/32* (2006.01)
  *G06F 21/62* (2013.01)

(52) U.S. Cl.
  CPC .......... *H04L 9/0825* (2013.01); *H04L 9/0894* (2013.01); *H04L 63/061* (2013.01); *G06F 2221/2107* (2013.01); *G06F 2221/2115* (2013.01); *H04L 63/0442* (2013.01)

(58) Field of Classification Search
  CPC ..... H04L 9/0825; H04L 9/0894; H04L 9/085; H04L 63/0442; G06F 2221/2107; G06F 2221/2215
  USPC .... 380/30, 44, 201, 255, 277; 713/150, 165, 713/166, 170
  See application file for complete search history.

(56) References Cited

U.S. PATENT DOCUMENTS

| | | | |
|---|---|---|---|
| 2003/0081785 A1* | 5/2003 | Boneh | H04L 9/0847 380/277 |
| 2003/0204729 A1* | 10/2003 | Rockwood | H04H 20/31 713/176 |
| 2006/0123462 A1* | 6/2006 | Lunt | H04L 63/102 726/1 |
| 2020/0076787 A1 | 3/2020 | D'Souza et al. | |

OTHER PUBLICATIONS

"Non Final Office Action Issued in U.S. Appl. No. 16/557,720", dated Dec. 17, 2020, 31 Pages.

* cited by examiner

CLOUD KEY ESCROW SYSTEM

CROSS-REFERENCE TO RELATED APPLICATIONS

This application is continuation from U.S. patent application Ser. No. 15/608,704 entitled "CLOUD KEY ESCROW SYSTEM," which was filed on May 30, 2017, and which will issue as U.S. Pat. No. 10,348,696 on Jul. 9, 2019, and which is incorporated by reference herein. U.S. patent application Ser. No. 15/608,704, in turn, was a continuation from U.S. patent application Ser. No. 14/542,904 entitled "CLOUD KEY ESCROW SYSTEM," which was filed on Nov. 17, 2014, and which issued as U.S. Pat. No. 9,667,599 on May 30, 2017, and which is incorporated by reference herein. U.S. patent application Ser. No. 14/542,904, in turn, was a divisional application from U.S. patent application Ser. No. 13/162,950 entitled "CLOUD KEY ESCROW SYSTEM," which was filed on Jun. 17, 2011, and which issued as U.S. Pat. No. 8,891,772 on Nov. 18, 2014, and which is incorporated by reference herein. This application is also related to U.S. patent application Ser. No. 13/162,985 entitled "CLOUD KEY DIRECTORY FOR FEDERATING DATA EXCHANGES," (now issued as U.S. Pat. No. 8,627,508) which is incorporated by reference herein.

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, software applications may be designed to interact with other software applications or other computer systems. For example, an application may be designed to store files on a network server. Some of the files stored on the network server may be sensitive or confidential. The user may wish to restrict access to those files. The files may then be encrypted or otherwise protected with a password or other key. The user may not trust the network server to store the key, and may thus desire to retain sole possession of the key. Such users, however, often lose (or forget) their passwords or keys. Moreover, other third party users may legitimately require access to the stored, encrypted files.

BRIEF SUMMARY

Embodiments described herein are directed to storing encrypted, third-party-accessible data in a data store and to providing third party data access to the stored encrypted data according to a predefined policy. In one embodiment, a data storage system receives encrypted data from source. The data is encrypted using a private key. The data storage system stores the received encrypted data in the data storage system according to a predefined policy. The encryption prevents the storage system from gaining access to the encrypted data, while the policy allows the encrypted data to be released upon receiving a threshold number of requests from verified third parties. The data storage system implements a verifiable secret sharing scheme to verify that the encrypted data can be reconstituted without the data storage system accessing the encrypted data. The data storage system also synchronously acknowledges to the source that the received encrypted data has been verified and successfully stored.

In another embodiment, a data storage system receives a request from a third party to access stored, encrypted data, where the data is stored in the data storage system according to a predefined policy. The encryption on the data prevents the storage system from gaining access to the encrypted data, while the policy allows the encrypted data to be released upon receiving a threshold number of requests from verified third parties. The data storage system sends a query to the verified third parties, requesting permission from the verified third parties to access the stored, encrypted data according to the predefined policy. The data storage system receives permission from at least a threshold number of the verified third parties and allows the requesting third party to access the stored, encrypted data according to the predefined policy.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
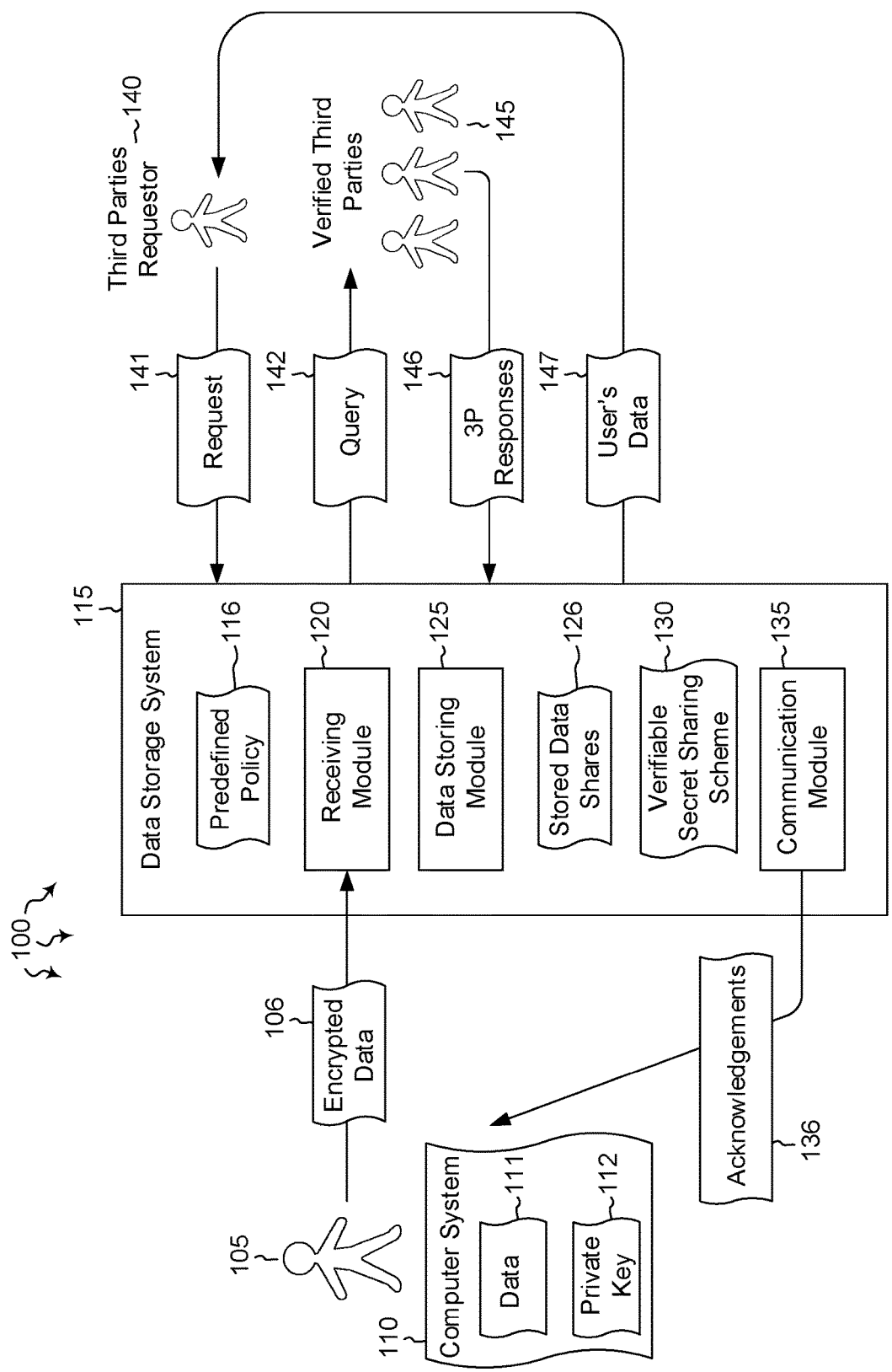
FIG. 1 illustrates a computer architecture in which embodiments of the present invention may operate including allowing a user to store encrypted, third-party-accessible data in a data store.

Embodiments described herein are directed to allowing a user to store encrypted, third-party-accessible data in a data store and to providing third party data access to a user's encrypted data according to a predefined policy. In one embodiment, a data storage system receives encrypted data from a user at a data storage system. The data is encrypted using the user's private key. The data storage system stores the received encrypted data in the data storage system according to a predefined policy. The encryption prevents the storage system from gaining access to the encrypted data, while the policy allows the encrypted data to be released upon receiving a threshold number of requests from verified third parties. The data storage system implements a verifiable secret sharing scheme to verify that the encrypted data can be reconstituted without the data storage system accessing the encrypted data. The data storage system also synchronously acknowledges to the user that the received encrypted data has been verified and successfully stored.

In another embodiment, a data storage system receives a request from a third party to access a user's stored, encrypted data, where the data is stored in the data storage system according to a predefined policy. The encryption on the data prevents the storage system from gaining access to the encrypted data, while the policy allows the encrypted data to be released upon receiving a threshold number of requests from verified third parties. The data storage system sends a query to the verified third parties, requesting permission from the verified third parties to access the user's stored, encrypted data according to the predefined policy. The data storage system receives permission from at least a threshold number of the verified third parties and allows the requesting third party to access the user's stored, encrypted data according to the predefined policy.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmissions media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

FIG. 1 illustrates a computer architecture 100 in which the principles of the present invention may be employed. Computer architecture 100 includes data storage system 115. The data storage system may be any type of distributed or local storage service or device, including individual or linked computer systems. In some cases, the data storage system may comprise the cloud (i.e. a vast network of interlinked computer systems). The data storage system may include various modules that are used to complete specific tasks. For instance, the receiving module 120 may receive data, data requests, queries or other incoming messages. The receiving module may, for example, receive encrypted data 106 from user 105. The encrypted data may be stored in the data storage system by data storing module 125.

The encrypted data 106 may be encrypted at the user's computer system 110. The user's data 111 may be encrypted using a private key 112. The private key allows the user to access the encrypted data, but prevents the data storage system from being able to access the data. In some cases, however, while the data storage system is not able to decrypt the user's data, it may be necessary for an outside entity (e.g. a governmental entity) to access the user's data. For example, in a criminal or other investigation, a third-party requestor 140 may request access to the user's data. In such cases, the data storage system may provide the user's data to the third-party requestor according to a predefined policy.

The predefined policy 116 may specify that the user's data can be released to a verified third-party requestor if certain conditions are met. For example, the policy may specify that if a threshold amount of verified third parties 145 respond saying that it is ok for the third-party requestor 140 to access the user's data, then the data storage system will provide that data. This process will be explained in greater detail below with regard to methods 200 and 300 of FIGS. 2 and 3, as well as computing environment 400 of FIG. 4.

Figure 2:
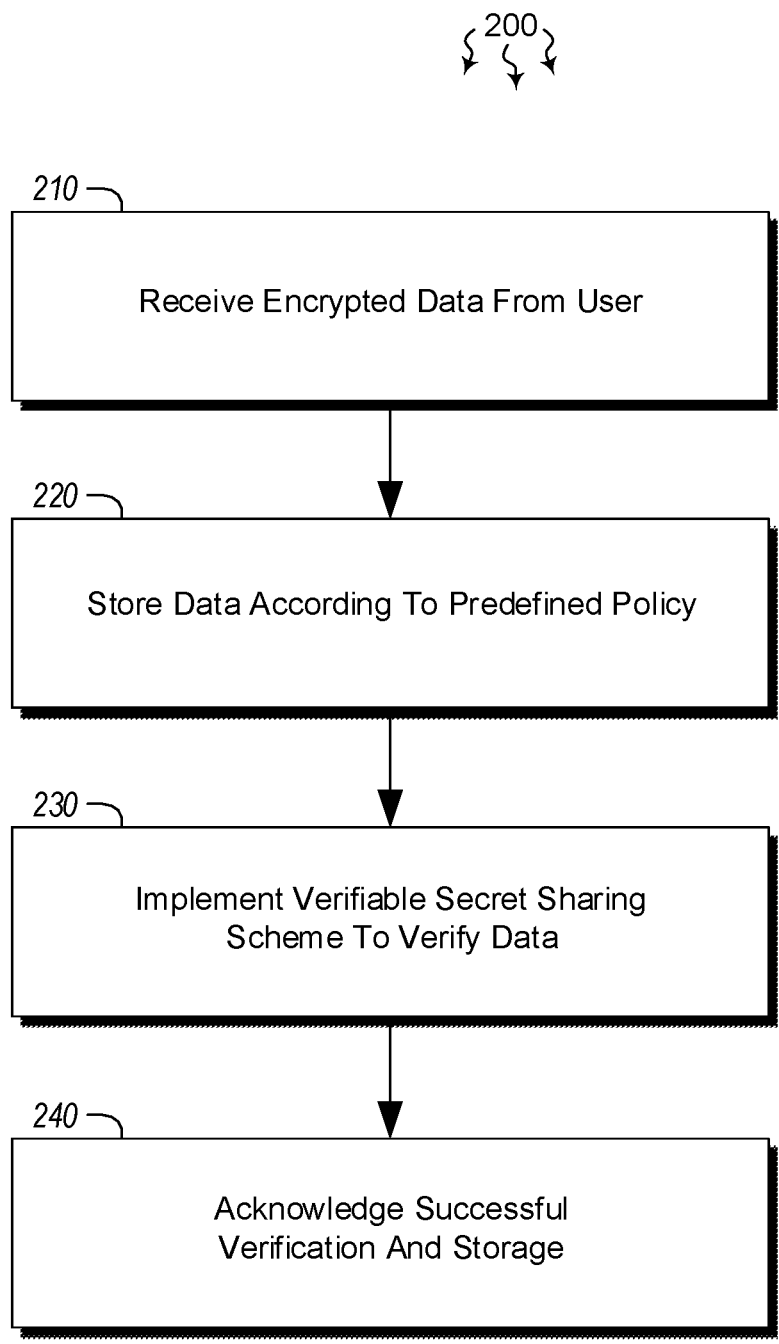
FIG. 2 illustrates a flowchart of an example method for allowing a user to store encrypted, third-party-accessible data in a data store.
Figure 3:
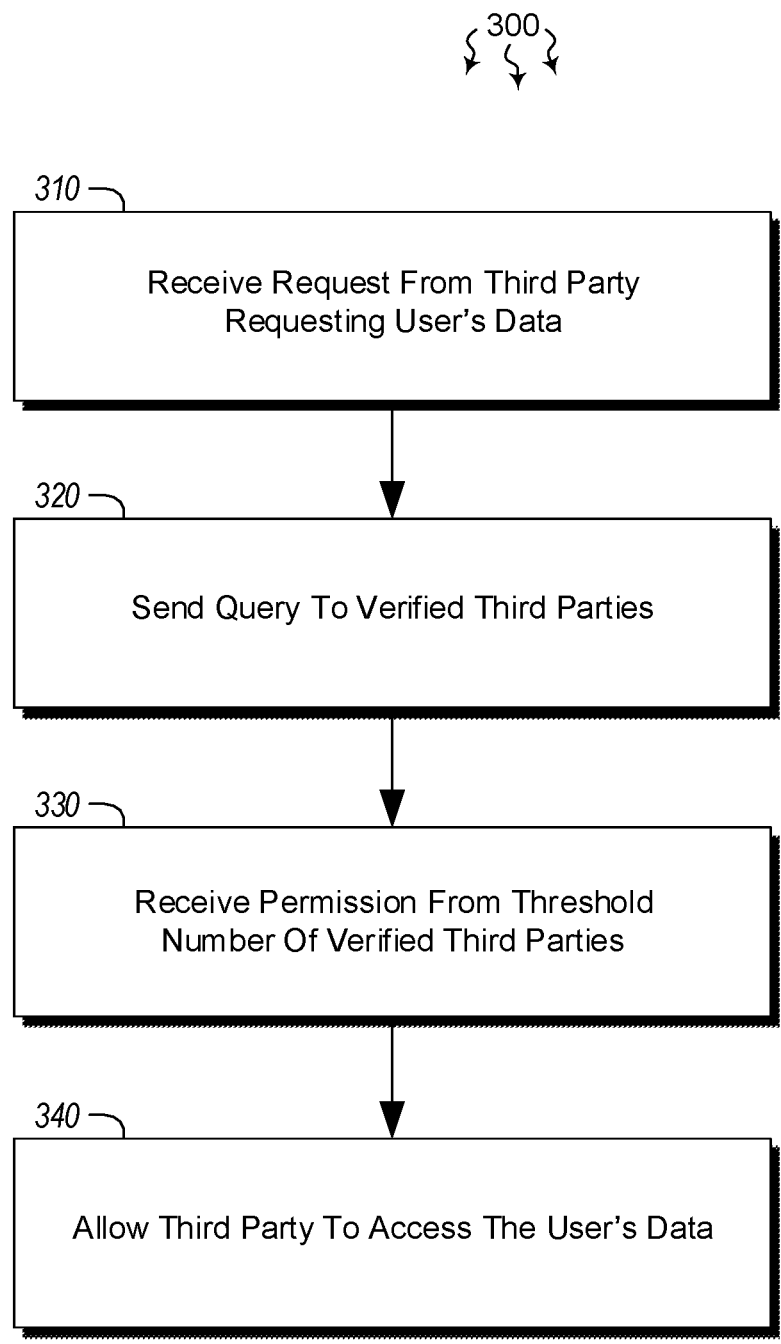
FIG. 3 illustrates a flowchart of an example method for providing third party data access to a user's encrypted data according to a predefined policy.
Figure 4:
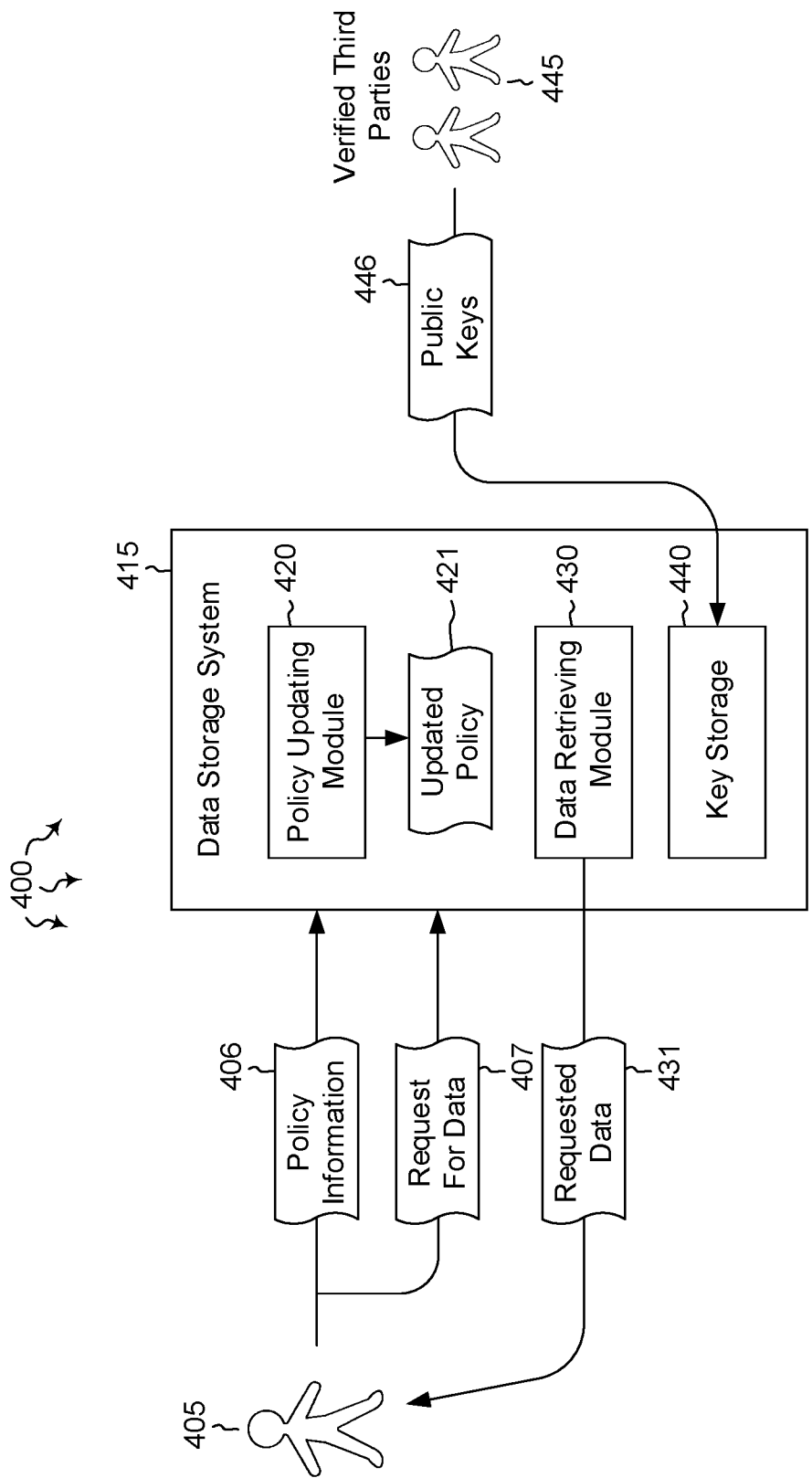
FIG. 4 illustrates a computer architecture in which third party data access is provided to a user's encrypted data according to a predefined policy.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for allowing a user to store encrypted, third-party-accessible data in a data store. The method 200 will now be described with frequent reference to the components and data of environment 100.

Method 200 includes an act of receiving encrypted data from a user at a data storage system, wherein the encrypted data is encrypted using the user's private key (act 210). For example, receiving module 120 of data storage system 115 may receive encrypted data 106 from user 105. The user's data 111 is encrypted using private key 112 or some other form of encryption. The encrypting takes place securely on the user's own computer system. This prevents the user from having to trust the data storage system to do the encrypting. In some cases, the encrypted data may include a cryptographic key belonging to the user. In cases where the data storage system is the cloud (or is part of the cloud), the user's cryptographic key is encrypted off-cloud on the user's computer system, maintaining privacy and trust. The user may also have a public key that is made public in a secure manner using a secure service that runs on the user's private (off-cloud) computer system.

Method 200 further includes an act of storing the received encrypted data in the data storage system according to a predefined policy, the encryption preventing the storage system from gaining access to the encrypted data, the policy allowing the encrypted data to be released upon receiving a threshold number of requests from verified third parties (act 220). For example, data storing module 125 may store the encrypted data 106 according to predefined policy 116. The policy may specify that the user's data is to be stored in the storage system and that no one will have access to the user's data unless a certain set of criteria are met. Those criteria may include having a certain number of verified third parties validating a requestor's request for the user's data. If that threshold number of verified third parties does indicate that the requestor can access the user's data, then the storage system will allow access to that user's data.

In some cases, the user may be able to modify the threshold number of requests from verified third parties in the policy that are to be received before the user's encrypted data is released. For instance, if the user wanted to strengthen the policy, the user could increase the number of third party vouchers that would have to be received before the user's data would be released. Alternatively, the user could loosen the policy by decreasing the threshold number. Once a request comes in from a third party 140 (e.g. a user, a business, a legal entity or governmental entity, etc.) to access user 105's data, the data storage system may send a query 142 to multiple different verified third parties 145. These verified third parties may be authenticated, trusted persons such as judges, notaries public, government officials or other trusted persons. Each verified third party may send his or her responses 146 back to the computer system.

In cases where the encrypted data is a cryptographic key, that key may be stored as a plurality of shares 126. The shares are mathematical transformations of the user's private key, and each share is provided to one of the verified third parties 145. Each verified third party publishes his or her own public keys, and encrypts his or her share of the encrypted key using their published public key. The verified third party shares encrypted according to the third partys' public keys are then stored in the data storage system 115. Because the shares are encrypted according to the verified third parties' public/private key pair, the data storage system is prevented from accessing the encrypted shares, and is further prevented from accessing the user's data.

The shares may be generated in such a way that a threshold gate is used to recreate the original key from those shares. This is the threshold number referred to above. The predefined policy 116 may indicate that the threshold gate is a specified number or percentage of the total number of shares. In this manner, when that specified number of verified third party share holders 145 has requested release of the encrypted data 160, the data storage system 115 provides the encrypted data to the requestor.

Thus, for example, if the received encrypted data 106 was split into five pieces, it would be sent to five different verified third parties. Each of those five parties would encrypt their share and upload it to the data storage system. Then, if a third-party requestor 140 requested the release of user 105's data 106, query 142 would be sent to each of the five verified third parties. The policy may indicate a threshold gate of three (or a percentage of, for example, 51% or greater), once three verified third parties had responded 146 in the affirmative, indicating that the user's data could be released, the data storage system would release the data.

Additionally or alternatively, the policy may include further limitations regarding specific verified third parties. For instance, the policy may specify a set of rules comprising Boolean logic that indicates which specific verified third parties are to request release of the encrypted data before the data storage system will release the encrypted data. For example, the user may specify that verified third parties A, C, and D or E must give their approval, regardless of (or in addition to) the total number (or percentage) of approvals received. Accordingly, many different policy options may be available involving different threshold numbers, percentages and specified verified third parties. Thus, the examples mentioned above should not be read as limiting what limitations can be implemented in the predefined policy.

In some cases, the users and trusted third parties in this system may be able to used the cloud directory described in the related patent referenced above ("Cloud Key Directory For Federating Data Exchanges") for discovering each other, and for publishing information about themselves to the others. Thus, a user may request information about a third party from the cloud key directory, and the directory may provide the information as allowed by the third party. Similarly, the third party may request information about a particular user, and the cloud key directory will provide the data as allowed by the user. For specific details on this functionality, please review the reference, which is incorporated herein in its entirety.

Method 200 also includes an act of the data storage system implementing a verifiable secret sharing scheme to verify that the encrypted data can be reconstituted without the data storage system accessing the encrypted data (act 230). For example, verifiable secret sharing scheme 130 may be used to verify that encrypted data 016 can be reconstituted or reformed without the data storage system accessing the data. The verifiable secret sharing scheme is a method for verifying data stored at a given location without actually accessing that data. Thus, user 105's encrypted data may be stored (e.g. as shares 126) and verified by the data storage system. The verifiable secret sharing scheme performs the verification without opening or looking at the encrypted data. The data storage system's communication module 135 synchronously acknowledges to the user that the received encrypted data has been verified and successfully stored (act 240). The communication module may send acknowledgement 136 to the user to acknowledge the safe and verified storage of the user's encrypted data.

Turning now to FIG. 3, FIG. 3 illustrates a flowchart of a method 300 for providing third party data access to a user's encrypted data according to a predefined policy. The method 300 will now be described with frequent reference to the components and data of environments 100 and 400 of FIGS. 1 and 4, respectively.

Method 300 includes an act of receiving a request from a third party to access a user's stored, encrypted data, the data being stored in a data storage system according to a predefined policy, the encryption preventing the storage system from gaining access to the encrypted data, the policy allowing the encrypted data to be released upon receiving a threshold number of requests from verified third parties (act 310). For example, third-party requestor 140 may request to access user 105's stored data. The user's data may be stored in shares 126 according to predefined policy 116. As explained above, the user's data encryption occurs on the user's private computer system and, as such, prevents the data storage system from accessing the data. The policy allows third-party requestors to access the user's data under certain conditions.

In some cases, the user's data may comprise, at least in part, a cryptographic key. The user's data, including the key, may be stored in multiple different shares. These shares are mathematical transformations of the user's private key. Each share is provided to one of the verified third parties 445. Each verified third party publishes his or her own public keys 446 and encrypts their share of the encrypted key using his or her published public key. The request 141 for permission to access the user's stored, encrypted data may include a request for each verified third party to provide their assigned share to the data storage system 415. The verified third party shares encrypted according to the third partys' public keys are stored in the data storage system. The encrypted shares prevent the data storage system from accessing either the shares or the user's data. It should also be noted that the verified third parties' keys may be stored in the data storage system in key storage 440.

Thus, method 300 includes an act of sending a query to a plurality of the verified third parties, requesting permission from the verified third parties to access the user's stored, encrypted data according to the predefined policy (act 320). Method 300 further includes an act of receiving permission from at least a threshold number of the verified third parties (act 330). This threshold number may be modified by the user to increase or decrease the strength of the policy. For example, user 405 may send a policy modification 406 to the policy updating module 420 of storage system 415. The policy updating module may change the policy according to the user's input. The user may change the number for the threshold amount, may change or add a threshold percentage, may specify certain verified third parties whose permission must be received, or may alter the policy in another manner. The updated policy will be used for any newly received third-party data requests.

Method 300 also includes an act of allowing the requesting third party to access the user's stored, encrypted data according to the predefined policy (act 340). For example, upon determining that a sufficient, threshold number of third party responses 146 have been received, the data storage system may allow access to that data. In some cases, the user themselves may request their stored data (e.g. in request 407). The data storage system may retrieve the user's data (using module 430) and send the requested data 431 to the user. In this manner, a user may securely store their data in the data storage system, while still allowing third-party data access when needed, according to a user-defined policy.

In some embodiments, instead of sending all of the data shares 126 to each of the verified third parties, each verified third party may generate his or her own public/private key pairs and publish those public keys to the data storage system. Then, the user has access to the public keys of all the third parties and may encrypt each share to the public key of that third party. This results in an encrypted file that only that third party whose key was used to encrypt the data can decrypt it with their private key. Each of the shares may be stored in the data storage system (in the cloud). The data storage system would thus have access to all the stored shares, and if the threshold number of verified third parties requests the user's data, the data storage system gives back the shares to each third party and he or she decrypts it with his or her private key.

Accordingly, methods, systems and computer program products are provided which allow a user to store encrypted, third-party-accessible data in a distributed data storage system. Moreover, methods, systems and computer program products are provided which provide third party data access to a user's encrypted data according to a predefined policy. Once the policy conditions have been met, the user's encrypted data is shared with the requesting third party.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A computer implemented method for securely storing encrypted data and providing access to the stored encrypted data according to a predefined policy, the method comprising:
- receiving a request from a requesting party to access stored, encrypted data, the encrypted data being stored in a data storage system according to a predefined policy, the encryption preventing the storage system from accessing the encrypted data, the policy allowing the encrypted data to be provided to an authorized entity only upon receiving permission to access the data from a threshold number of verified third parties, wherein the requesting party is authorized to access to the stored, encrypted data according to the policy after permission has been received from at least the threshold number of verified third parties;
- in response to receiving the request to access the stored, encrypted data, sending a query to a plurality of the verified third parties, the query requesting permission from the verified third parties to access the stored, encrypted data according to the predefined policy;
- receiving a response to the query from at least a threshold number of the verified third parties, each received response including permission to access the stored, encrypted data; and in response to receiving permission to access the stored, encrypted data from at least a threshold number of the verified third parties, allowing the requesting party to access the stored, encrypted data according to the predefined policy.

2. The method of claim 1, wherein a stored encrypted key is stored as a plurality of shares, the shares being mathematical transformations of a user's private key, and wherein each share is provided to one of the verified third parties.

3. The method of claim 2, wherein each verified third party publishes their own public keys and encrypts their share of the encrypted key using their published public key.

4. The method of claim 1, wherein the request to access the stored, encrypted data comprises a request for each verified third party to provide an assigned share to the storage system.

5. The method of claim 1, wherein verified third party shares encrypted according to the third party's public keys are stored in the data storage system, the encrypted shares preventing the data storage system from accessing the stored encrypted data.

6. The method of claim 1, wherein a verifiable secret sharing scheme performs a verification without opening or looking at the encrypted data.

7. The method of claim 1, wherein the predefined policy indicates a set of rules comprising logic indicating which specific verified third parties are to request release of the encrypted data before the data storage system will release the encrypted data.

8. A computer program product for implementing steps for securely storing encrypted data and providing access to the stored encrypted data according to a predefined policy, the computer program product comprising one or more computer readable storage devices having encoded therein computer executable instructions which, when executed upon one or more computer processors, cause the processors to perform the steps comprising:
- receiving a request from a requesting party to access stored, encrypted data, the encrypted data being stored in a data storage system according to a predefined policy, the encryption preventing the storage system from accessing the encrypted data, the policy allowing the encrypted data to be provided to an authorized entity only upon receiving permission to access the data from a threshold number of verified third parties, wherein the requesting party is authorized to access to the stored, encrypted data according to the policy after permission has been received from at least the threshold number of verified third parties;
- in response to receiving the request to access the stored, encrypted data, sending a query to a plurality of the verified third parties, requesting permission from the verified third parties to access the stored, encrypted data according to the predefined policy;
- receiving a response to the query from at least a threshold number of the verified third parties, each received response including permission to access the stored, encrypted data; and
- in response to receiving permission to access the stored, encrypted data from at least a threshold number of the verified third parties, allowing the requesting party to access the stored, encrypted data according to the predefined policy.

9. The computer program product of claim 8, wherein a stored encrypted key is stored as a plurality of shares, the shares being mathematical transformations of a user's private key, and wherein each share is provided to one of the verified third parties.

10. The computer program product of claim 9, wherein each verified third party publishes their own public keys and encrypts their share of the encrypted key using their published public key.

11. The computer program product of claim 8, wherein the request to access the stored, encrypted data comprises a request for each verified third party to provide an assigned share to the storage system.

12. The computer program product of claim 8, wherein verified third party shares encrypted according to the third party's public keys are stored in the data storage system, the encrypted shares preventing the data storage system from accessing the stored encrypted data.

13. The computer program product of claim 8, wherein a verifiable secret sharing scheme performs a verification without opening or looking at the encrypted data.

14. The computer program product of claim 8, wherein the predefined policy indicates a set of rules comprising logic indicating which specific verified third parties are to request release of the encrypted data before the data storage system will release the encrypted data.

15. A computer system for securely storing encrypted data and providing access to the stored encrypted data according to a predefined policy, the system comprising one or more computer processors and computer readable media having encoded therein computer executable instructions which, when executed upon the one or more processors, cause the system to perform:
- receiving a request from a requesting party to access stored, encrypted data, the encrypted data being stored in a data storage system according to a predefined policy, the encryption preventing the storage system from accessing the encrypted data, the policy allowing the encrypted data to be provided to au authorized entity only upon receiving permission to access the data front a threshold number of verified third parties, wherein the requesting party is authorized to access to the stored, encrypted data according to the policy after permission has been received from at least the threshold number of verified third parties;

in response to receiving the request, to access the stored, encrypted data, sending a query to a plurality of the verified third parties, requesting permission from the verified third parties to access the stored, encrypted data according to the predefined policy;

receiving a response to the query from at least a threshold number of the verified third parties, each received response including permission to access the stored, encrypted data; and in response to receiving permission to access the stored, encrypted data from at least a threshold number of the verified third parties, allowing the requesting party to access the stored, encrypted data according to the predefined policy.

16. The system of claim 15, wherein a stored encrypted key is stored as a plurality of shares, the shares being mathematical transformations of a user's private key, and wherein each share is provided to one of the verified third parties.

17. The system of claim 16, wherein each verified third party publishes their own public keys and encrypts their share of the encrypted key using their published public key.

18. The system of claim 15, wherein the request to access the stored, encrypted data comprises a request for each verified third party to provide an assigned share to the storage system.

19. The system of claim 15, wherein verified third party shares encrypted according to the third party's public keys are stored in the data storage system, the encrypted shares preventing the data storage system from accessing the stored encrypted data.

20. The system of claim 15, wherein a verifiable secret sharing scheme performs a verification without opening or looking at the encrypted data.

* * * * *